(12) United States Patent
Joshi et al.

(10) Patent No.: US 12,106,753 B2
(45) Date of Patent: Oct. 1, 2024

(54) CODE-MIXED SPEECH RECOGNITION USING ATTENTION AND LANGUAGE-SPECIFIC JOINT ANALYSIS

(71) Applicant: Microsoft Technology Licensing, LLC, Redmond, WA (US)

(72) Inventors: Vikas Joshi, Bengaluru (IN); Purvi Agrawal, Hyderabad (IN); Rupeshkumar Rasiklal Mehta, Hyderabad (IN); Aditya Rajesh Patil, Pune (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 353 days.

(21) Appl. No.: 17/689,632

(22) Filed: Mar. 8, 2022

(65) Prior Publication Data
US 2023/0290345 A1    Sep. 14, 2023

(51) Int. Cl.
*G10L 15/197* (2013.01)
*G06N 3/044* (2023.01)
(Continued)

(52) U.S. Cl.
CPC ............ *G10L 15/197* (2013.01); *G06N 3/044* (2023.01); *G10L 15/005* (2013.01);
(Continued)

(58) Field of Classification Search
CPC ... G10L 15/197; G10L 15/005; G10L 15/063; G10L 15/16; G10L 15/22; G10L 15/01; G06N 3/044
See application file for complete search history.

(56) References Cited

U.S. PATENT DOCUMENTS 11,151,984 B2 *  10/2021  Lichun .................... G10L 25/78
2019/0189111 A1   6/2019  Watanabe et al.
(Continued)

FOREIGN PATENT DOCUMENTS

CN    112599128 A    4/2021
WO    2020113031 A1  6/2020

OTHER PUBLICATIONS

PCT Search Report and Written Opinion for PCT/US2022/054306, mailing date listed: May 2, 2023, received Apr. 2023, 14 pages.
(Continued)

*Primary Examiner* — Richemond Dorvil
*Assistant Examiner* — Zeeshan Mahmood Shaikh

(57) ABSTRACT

An automatic speech recognition (ASR) system recognizes speech expressed in different languages. The ASR system includes a language-agnostic encoding component and prediction component. A language-specific joint analysis system generates first-language probabilities for symbols of a first language and second-language probabilities for symbols of a second language, based on outputs generated by the encoding component and the prediction component. The ASR system then modifies the probabilities produced by the joint analysis system by language-specific weighting information that, in turn, is produced by an attention system. This yields modified first-language probabilities and modified second-language probabilities. Finally, the ASR system predicts an updated instance of label information based on the modified first-language probabilities and the modified second-language probabilities. The ASR system can be successfully applied to recognize an utterance that combines words in two or more languages. The ASR system is further capable of being run on resource-constrained computing platforms.

19 Claims, 9 Drawing Sheets

(51) Int. Cl.
G10L 15/00 (2013.01)
G10L 15/06 (2013.01)
G10L 15/16 (2006.01)
G10L 15/22 (2006.01)

(52) U.S. Cl.
CPC ............ *G10L 15/063* (2013.01); *G10L 15/16* (2013.01); *G10L 15/22* (2013.01)

(56) References Cited

U.S. PATENT DOCUMENTS

2019/0318725 A1   10/2019  Le Roux et al.
2020/0160836 A1*   5/2020  Chen ..................... G10L 15/005
2020/0335083 A1*  10/2020  Wan ....................... G06N 3/044
2020/0380215 A1*  12/2020  Kannan .................... G06N 3/08

OTHER PUBLICATIONS

Espacenet abstract for CN112599128A, available at https://worldwide.espacenet.com/patent/search/family/075206862/publication/CN112599128A?q=pn%3DCN112599128A, accessed on Apr. 27, 2023, 1 page.
Google Patents translation of CN112599128A, available at https://patents.google.com/patent/CN112599128A/en?oq=cn112599128, accessed on Apr. 27, 2023, 15 pages.
Graves, Alex, "Sequence Transduction with Recurrent Neural Networks," arXiv e-prints, arXiv:1211.3711v1 [cs.NE], Nov. 14, 2012, 9 pages.
Sutskever, et al., "Sequence to Sequence Learning with Neural Networks," arXiv e-prints, arXiv:1409.3215v3 [cs.CL], Dec. 14, 2014, 9 pages.
He, et al., "Streaming End-to-End Speech Recognition for Mobile Devices," arXiv e-prints, arXiv:1811.06621v1 [cs.CL], Nov. 15, 2018, 5 pages.
Kannan, et al., "Large-Scale Multilingual Speech Recognition with a Streaming End-to-End Model," in Proceedings of Interspeech, Sep. 2019, pp. 2130-2134.
Li, et al., "Improving RNN Transducer Modeling for End-to-End Speech Recognition," arXiv e-prints, arXiv:1909.12415v1 [cs.CL], Sep. 26, 2019, 8 pages.
Narayanan, et al., "Recognizing Long-Form Speech Using Streaming End-to-End Models," arXiv e-prints, arXiv:1910.11455v1 [eess.AS], Oct. 24, 2019, 8 pages.
Pratap, et al., "Massively Multilingual ASR: 50 Languages, 1 Model, 1 Billion Parameters," arXiv e-prints, arXiv:2007.03001v2 [eess.AS], Jul. 8, 2020, 5 pages.
Joshi, et al., "Multiple Softmax Architecture for Streaming Multilingual End-to-End ASR Systems," in Proceedings of Interspeech 2021, Aug. 2021, pp. 1767-1771.
Li, et al., "Improving RNN Transducer Modeling for End-to-End Speech Recognition," in Proceedings of Automatic Speech Recognition and Understanding Workshop, Dec. 14, 2019, pp. 114-121.
Tripathi, et al., "Transformer Transducer: One Model Unifying Streaming and Non-Streaming Speech Recognition," arXiv:2010.03192v1 [cs.SD], Oct. 7, 2020, 5 pages.
Zhang, et al., "RNN-Transducer with Language Bias for End-to-End Mandarin-English Code-Switching Speech Recognition," arXiv e-prints, arXiv:2002.08126v1 [cs.CL], Feb. 19, 2020, 7 pages.
Dalmia, et al., "Transformer-Transducers for Code-Switched Speech Recognition," arXiv e-prints, arXiv:2011.15023v2 [cs.CL], Feb. 15, 2021, 5 pages.
Bie, et al., "A Simplified Fully Quantized Transformer for End-to-End Speech Recognition," arXiv e-prints, arXiv:1911.03604v4 [cs.CL], Mar. 24, 2020, 5 pages.
"Grapheme," available at https://en.wikipedia.org/wiki/Grapheme, Wikipedia article, accessed on Feb. 5, 2022, 4 pages.
Zhang, et al., "Highway Long Short-Term Memory RNNs for Distance Speech Recognition," arXiv e-print, arXiv:1510.08983v2 [cs.NE], Jan. 11, 2016, 5 pages.

Wang, et al., "Transformer in Action: A Comparative Study of Transformer-Based Acoustic Models for Large Scale Speech Recognition Applications," arXiv e-prints, arXiv:2010.14665v2 [cs.CL], Oct. 29, 2020, 5 pages.
Vaswani, et al., "Attention Is All You Need," in 31st Conference on Neural Information Processing Systems (NIPS 2017), 2017, 11 pages.
"Amazon's Alexa Speaks Hinglish in an Indian Accent, and Apple's Siri will too," accessible at https://indianexpress.com/article/technology/amazons-alexa-speaks-hinglish-in-an-indian-accent-and-apples-siri-will-too-4915518/, in the Indian Express, Oct. 31, 2017, 6 pages.
Emond, et al., "Transliteration Based Approaches to Improve Code-Switched Speech Recognition Performance," in Proceedings of Spoken Language Technology Workshop, Dec. 2018, pp. 448-455.
Pratap, et al., "Massively Multilingual ASR: 50 Languages, 1 Model, 1 Billion Parameters," in Proceedings of Interspeech, Oct. 2020, pp. 4751-4755.
Schwartz, Erich Hal, "Amazon's Alexa Now Speaks Hindi and Hinglish," accessible at https://voicebot.ai/2019/09/19/amazons-alexa-now-speaks-hindi-and-hinglish/, in voicebot.ai, Sep. 19, 2019, 8 pages.
Tong, et al., "An Investigation of Deep Neural Networks for Multilingual Speech Recognition Training and Adaptation," in Proceedings of Interspeech 2017, 2017, 5 pages.
Thomas, et al., "Multilingual MLP Features for Low-resource LVCSR Systems," in 2012 IEEE International Conference on Acoustics, Speech and Signal Processing (ICASSP), 2012, 4 pages.
Swietojanski, et al., "Unsupervised cross-lingual knowledge transfer in DNN-based LVCSR," in IEEE Spoken Language Technology Workshop (SLT), IEEE, 2012, 6 pages.
Heigold, et al., "Multilingual acoustic models using distributed deep neural networks," in Proceedings of the IEEE International Conference on Acoustics, Speech, and Signal Processing (ICASSP), 2013, 5 pages.
Kunze, et al., "Transfer Learning for Speech Recognition on a Budget," in Proceedings of the 2nd Workshop on Representation Learning for NLP, Aug. 2017, pp. 168-177.
Huang, et al., "Multi-Accent Deep Neural Network Acoustic Model with Accent-Specific Top Layer Using the KLD-Regularized Model Adaptation," in Proceedings of Interspeech, 2014, pp. 2977-2981.
Scanzio, et al., "On the Use of a Multilingual Neural Network Front-End," in Proceedings of Interspeech, 2008, 4 pages.
Yu, et al., "Efficient and effective algorithms for training single-hidden-layer neural networks," available at https://web.archive.org/web/20180724000816/ttps://www.microsoft.com/en-us/research/wp-content/uploads/2016/02/SingleLayerBatchTrain-PatternRecLetter2011-FinalDraft.pdf, Internet Archive at the Wayback Machine, Jul. 24, 2018, 17 pages.
Huang, et al., "Cross-language knowledge transfer using multilingual deep neural network with shared hidden layers," in Proceedings of ICASSP, 2013, 5 pages.
Seltzer, et al., "Multi-task learning in deep neural networks for improved phoneme recognition," in Proceedings of ICASSP, 2013, pp. 6965-6969.
Deng, et al., "Ensemble Deep Learning for Speech Recognition," in Proceedings of Interspeech, 2014, 5 pages.
Waters, et al., "Towards acoustic model unification across dialects," in 2016 IEEE Workshop on Spoken Language Technology, 2016, pp. 624-628.
Das, et al., "Multi-Dialect Speech Recognition in English Using Attention on Ensemble," in ICASSP, Jun. 2021, pp. 6244-6248.
Joshi, et al., "Transfer Learning Approaches for Streaming End-to-End Speech Recognition System," arXiv, arXiv:2008.05086v2 [eess.AS], Aug. 17, 2020, 5 pages.
Giollo, et al., "Bootstrap an End-to-end ASR System by Multilingual Training, Transfer Learning, Text-to-text Mapping and Synthetic Audio," arXiv, arXiv:2011.12696v2 [eess.AS], Jun. 18, 2021, 5 pages.
Shetty, et al., "Improving the Performance of Transformer Based Low Resource Speech Recognition for Indian Languages," in Proceedings of ICASSP, 2020, pp. 8279-8283.

(56) References Cited

OTHER PUBLICATIONS

Punjabi, et al., "Streaming End-to-End Bilingual ASR Systems with Joint Language Identification," arXiv, arXiv:2007.03900v1 [eess.AS], Jul. 8, 2020, 5 pages.

Zhu, et al., "Multilingual Speech Recognition with Self-Attention Structured Parameterization," in Proceedings of Interspeech, 2020, pp. 4741-4745.

Li, et al., "Bytes are All You Need: End-to-End Multilingual Speech Recognition and Synthesis with Bytes," arXiv, arXiv:1811.09021v1 [eess.AS], Nov. 22, 2018, 5 pages.

Paszke, et al., "PyTorch: An Imperative Style, High-Performance Deep Learning Library," in 33rd Conference on Neural Information Processing Systems (NeurIPS 2019), 2019, 12 pages.

Li, et al., "Developing RNN-T Models Surpassing High-Performance Hybrid Models with Customization Capability," arXiv, arXiv:2007.15188v1 [eess.AS], Jul. 30, 2020, 5 pages.

Li, et al., "On the Comparison of Popular End-to-End Models for Large Scale Speech Recognition," arXiv, arXiv:2005.14327v2 [eess.AS], Jul. 30, 2020, 5 pages.

Patil, et al., "Streaming Bilingual End-to-End ASR Model Using Attention Over Multiple Softmax," arXiv, arXiv:2401.11645v1 [eess.AS], Jan. 22, 2024, 8 pages.

Patil, et al., "Streaming Bilingual End-to-End ASR Model Using Attention Over Multiple Softmax," available at https://ieeexplore.ieee.org/document/10022475, accessed on Apr. 25, 2024, abstract of paper that appears in IEEE Spoken Language Technology Workshop (SLT), Jan. 2023, 4 pages.

Shetty, et al., "Improving performance of Transformer based Low Resource Speech Recognition for Indian Languages," available at https://web.archive.org/web/20240420095219/https://sigport.org/sites/default/files/docs/shetty_0.pdf, Internet Archive at the Wayback Machine, Apr. 20, 2024, 52 pages.

* cited by examiner

EXAMPLE OF BEAM SEARCH FOR BEAM WIDTH = 2

CONT. FROM FIG. 8

IN A WEIGHT-GENERATING OPERATION, PRODUCE WEIGHTING INFORMATION FOR THE FIRST LANGUAGE AND THE SECOND LANGUAGE BASED ON THE ENCODED ACOUSTIC INFORMATION, THE WEIGHTING INFORMATION INCLUDING A FIRST WEIGHT THAT INDICATES A LIKELIHOOD THAT THE INSTANCE OF ACOUSTIC INFORMATION IS EXPRESSED IN THE FIRST LANGUAGE, AND A SECOND WEIGHT THAT INDICATES A LIKELIHOOD THAT THE INSTANCE OF ACOUSTIC INFORMATION IS EXPRESSED IN THE SECOND LANGUAGE.
902

SMOOTH THE WEIGHTING INFORMATION BASED ON PREVIOUSLY-GENERATED WEIGHTING INFORMATION.
904

IN A WEIGHT MODIFICATION OPERATION, MODIFY THE FIRST-LANGUAGE PROBABILITIES BY THE FIRST WEIGHT, TO PRODUCE MODIFIED FIRST-LANGUAGE PROBABILITIES, AND MODIFY THE SECOND-LANGUAGE PROBABILITIES BY THE SECOND WEIGHT, TO PRODUCE MODIFIED SECOND-LANGUAGE PROBABILITIES.
906

PREDICT AN UPDATED INSTANCE OF LABEL INFORMATION BASED ON THE MODIFIED FIRST-LANGUAGE PROBABILITIES AND THE MODIFIED SECOND-LANGUAGE PROBABILITIES.
908

FIG. 9

ILLUSTRATIVE OPERATION OF THE TRAINING SYSTEM 126
1002

TRAIN A VERSION OF THE MODEL THAT OMITS MODEL FUNCTIONALITY THAT PERFORMS THE WEIGHT-GENERATING OPERATION.
1004

SEPARATELY TRAIN THE MODEL FUNCTIONALITY THAT PERFORMS THE WEIGHT-GENERATING OPERATION.
1006

TRAIN A VERSION OF THE MODEL THAT INCLUDES THE MODEL FUNCTIONALITY THAT PERFORMS THE WEIGHT-GENERATING OPERATION, AS TRAINED BY BLOCK 1006.
1008

FIG. 10

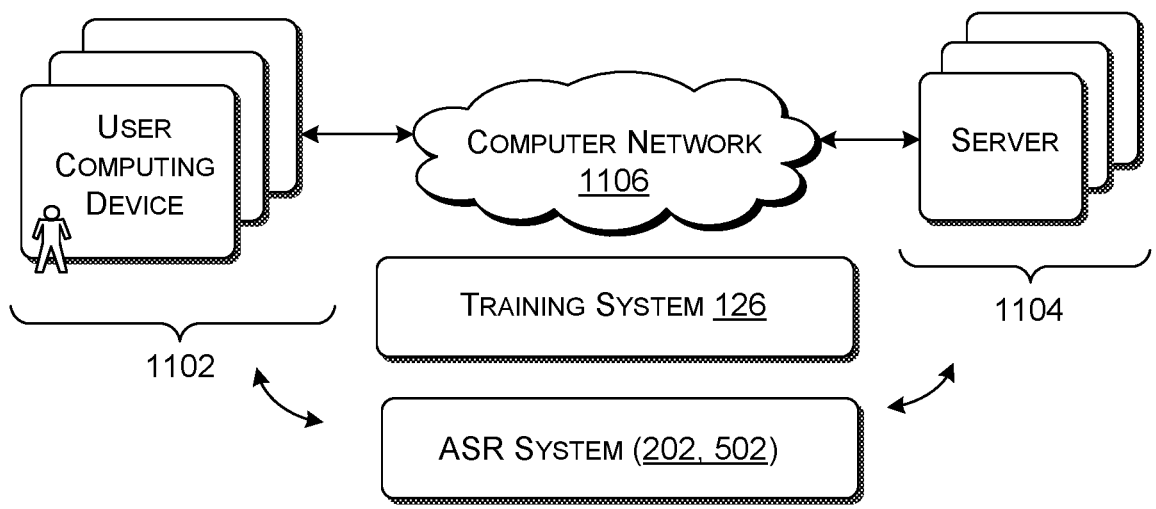

FIG. 11

CODE-MIXED SPEECH RECOGNITION USING ATTENTION AND LANGUAGE-SPECIFIC JOINT ANALYSIS

BACKGROUND

There has been considerable interest in developing multilingual automatic speech recognition (ASR) systems that can recognize utterances expressed in two or more natural languages. In one context, an ASR system recognizes different utterances expressed in their respective entireties in different languages. This kind of ASR system, for instance, can recognize a French-language utterance spoken by a first user and an English-language utterance spoken by a second user. In another context, referred to as code-mixing, an ASR system recognizes speech spoken by a single user that mixes words in two or more natural languages in more complex ways. For example, this type of ASR system can recognize a single utterance of an Indian speaker that includes a mix of Hindi and English words.

The task of developing an efficient multilingual ASR system is challenging. For example, one kind of multilingual ASR system includes separate machine-trained monolingual models for recognizing speech expressed in different natural languages. In some implementations, a speaker of a native language may manually select an appropriate model for use in recognizing his or her speech. Or a separate machine-trained model can detect the language of the speaker, which the model expresses as a language identifier (LID). This type of ASR system has a relatively large memory footprint, and therefore may be unsuitable for resource-constrained computing platforms, such as handheld computing devices. This type of ASR system is also incapable of performing real-time speech recognition in the code-mixing scenario described above.

SUMMARY

An end-to-end automatic speech recognition (ASR) system is described herein that can efficiently recognize speech expressed in different languages. The ASR system can also perform the more specific task of recognizing speech in a single utterance that combines words expressed in different languages. In some implementations, the ASR system includes a language-agnostic encoder component which encodes an instance of acoustic information, to produce encoded acoustic information. It also includes a language-agnostic prediction component which processes a prior instance of label information that has been previously predicted by the ASR system, to produce prediction information. The ASR system further includes a language-specific joint analysis system that separately generates first-language probabilities for linguistic symbols of a first language and second-language probabilities for linguistic symbols of a second language; it produces these probabilities based on the encoded acoustic information and the prediction information. The ASR system modifies these probabilities by language-specific weighting information that, in turn, is produced by a weight-modifying operation; this yields modified first-language probabilities and modified second-language probabilities. Finally, the ASR system predicts an updated instance of label information based on the modified first-language probabilities and the modified second-language probabilities. The ASR can extend the same manner of operation summarized above for any three or more languages.

In some implementations, the weight-generating operation is implemented by an attention system that performs self-attention.

In some implementations, the ASR system includes a weight correction component that smooths the weighting information produced by the weighting-generating operation.

In some implementations, the ASR system predicts the updated instance of speech by performing a single symbol search operation (e.g., a single beam search operation) over the symbols of the first language and the second language, based on the modified first-language probabilities and the modified second-language probabilities.

In some implementations, the ASR system produces output information that includes words in the first language expressed in a script that is native to the first language, together with words in the second language expressed in a script that is native to the second language.

In some implementations, the ASR system uses a machine-trained model that is trained by: (a) training a version of the model that omits model functionality that performs a weight-generating operation (e.g., corresponding to the part of the model that implements the attention system); (b) separately training the model functionality that performs the weight-generating operation; and (c) training a version of the model that includes the model functionality that performs the weight-generating operation, as produced in operation (b).

The ASR system successfully recognizes utterances that include words expressed in different natural languages without requiring a user to explicitly identify the transitions between different languages. The ASR system also uses a memory-efficient and processor-efficient machine-trained model, making it suitable for operation on resource-constrained computing platforms. Multiple factors contribute to the efficiency of the model, including the use of a language-agnostic encoder component and a language-agnostic prediction component, and the use of a single symbol search operation. Other technical advantages are set forth in the Detailed Description.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 8 and 9 together provide a flowchart that presents an overview of one manner of operation of the ASR systems of FIGS. 2 and 5.

FIG. 10 is a flowchart that provides an overview of one manner of operation of a training system of FIG. 1.

FIG. 11 shows computing equipment that can be used to implement the computing system shown in FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative automatic speech recognition (ASR) systems for recognizing speech expressed in different natural languages. Section B sets forth illustrative methods that explain the operation of the ASR systems of Section A. And Section C describes illustrative computing functionality that can be used to implement any aspect of the features described in Sections A and B.

A. Illustrative ASR Systems

Figure 1:
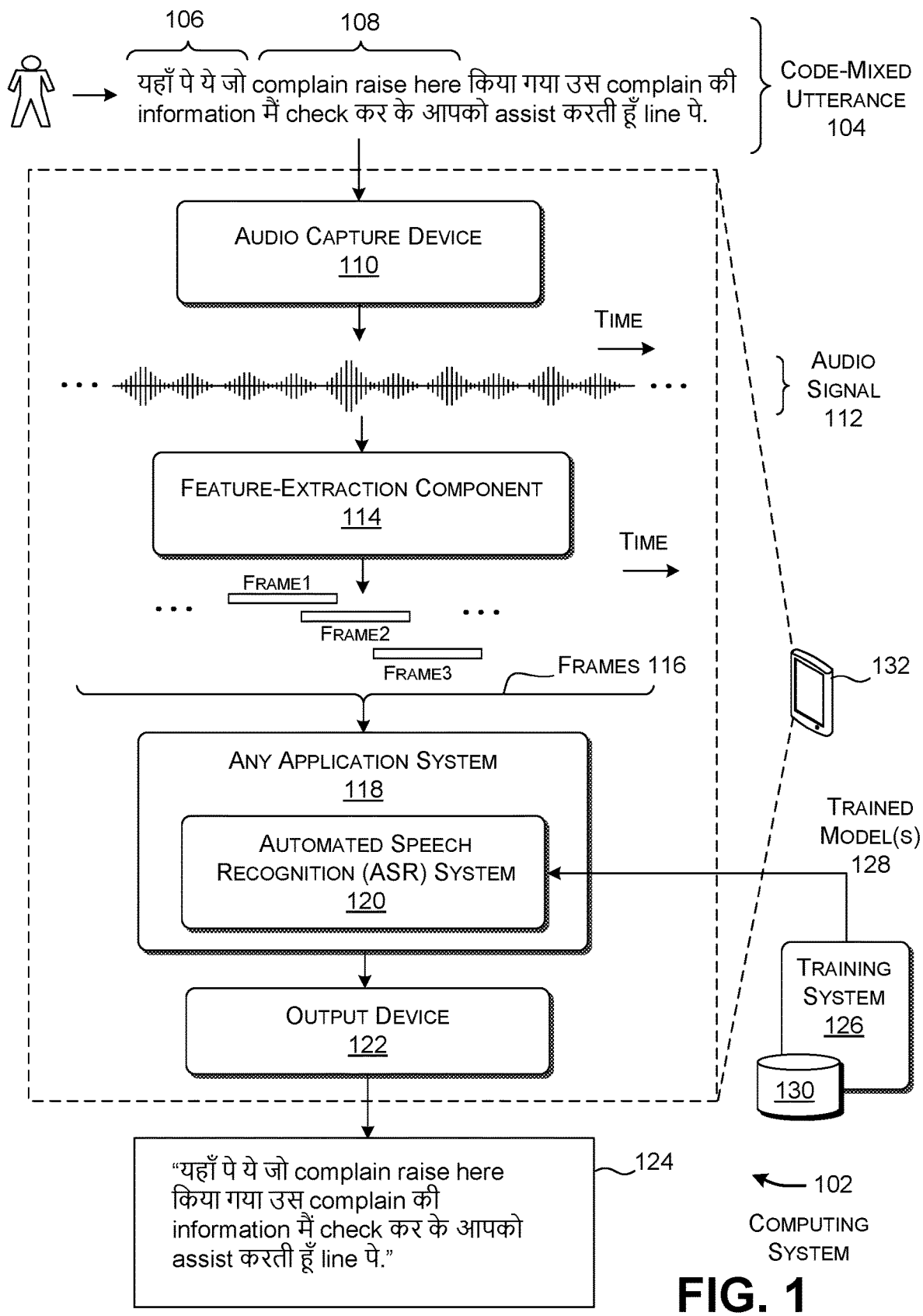
FIG. 1 shows an overview of a computing system that performs automatic speech recognition.

FIG. 1 shows an overview of an illustrative computing system 102 that processes an utterance 104. In this example, the utterance 104 includes a combination of word expressed in the Hindi language (such as spoken content 106) and words expressed in the English language (such as spoken content 108). In other examples (not shown), the computing system 102 can process utterances that include words expressed in three or more natural languages (henceforth, simply "languages"). In other examples (not shown), the computing system 102 processes utterances that are, in their respective entireties, expressed in different natural languages. The literature generally describes any system that is capable of translating utterances in different languages as a multilingual system. The technical literature more specifically refers to the practice in which a user combines words in different languages in a single utterance as "code mixing." Code-mixing is quite common in some regions of the world, such as India.

An audio capture device 110 (e.g., a microphone) captures an audio signal 112 that represents information conveyed by the utterance 104. A feature-extraction component 114 converts the signal 112 into digital information (if not already in digital form), and then extracts features from the digital information. For example, the feature-extraction component 114 can capture Mel-frequency cepstral coefficients (MFCCs) from the digital information.

In some non-limiting implementations, the feature-extraction component 114 produces a series of frames 116, each of which includes features extracted in a specified span of time (e.g., without limitation, a span of 25 milliseconds in length). In some non-limiting implementations, the feature-extraction component 114 moves the 25 millisecond span ahead in increments of 10 milliseconds, leaving a 15 milli-second overlap between neighboring frames. The audio capture device 110 and the feature-extraction component 114 can be generally said to produce acoustic information composed of a series of instances of acoustic information (e.g., frames).

An application system 118 uses an automatic speech recognition (ASR) system 120 to convert the acoustic information provided by the feature-extraction component 114 into recognized speech. Examples of the application system 118 include, but are not limited to: a call center application; an automated voice assistant (which can be implemented as a BOT); a transcription service; a messaging application; a social media application; any speech control application; a closed-captioning application; a speech read-out application for those with hearing impairments, and so on. For example, the transcription service can use the ASR system 120 to produce a textual transcription of a conversation in a videoconference session. The closed-captioning application can use the ASR system 120 to provide a real-time textual readout of audio content in a streaming media presentation.

The application system 118 produces output information that represents an outcome of its processing. In some implementations, the application system 118 sends the output information to an output device 122 for presentation to a user. For example, the output device 122 may correspond to a display device for showing the user a transcription of spoken words. Alternatively, or in addition, the output device 122 may correspond to a speaker that reads back spoken words as understood by the ASR system 120, inviting the user to correct any errors in the output information. Alternatively, or in addition, any control mechanism can operate on the output information without explicitly alerting the user to the recognized speech produced by the ASR system 120.

In the illustrative case of FIG. 1, the output device 122 is a display device that presents a transcript 124 of the utterance 104. Note that the transcript includes words expressed in different scripts associated with Hindi and English, respectively. The ASR system 120 produces output information in the Devanagari script upon concluding that a word in the utterance 104 most likely corresponds to a Hindi-language word. The ASR system 120 produces output information in Latin characters upon concluding that a word in the utterance 104 mostly likely corresponds to an English-language word.

In some implementations, the ASR system 120 is implemented using an end-to-end machine-trained model 128. A training system 126 trains the machine-trained model 128 using a training set in a data store 130. The training set includes sample utterances and their associated ground-truth transcriptions. As will be described in further detail below, the training system 126 can use a three-stage training operation to produce the machine-trained model 128.

In some implementations, the computing system 102 is implemented, in its entirety, using a resource-constrained computing platform 132, such as a smartphone, voice-controlled appliance, virtual reality device or mixed reality device, a wearable computing device, and so on. As will be explained in greater detail below, the computing system 102 can be implemented on resource-constrained platforms because the machine-trained model 128 uses a resource-efficient architecture, e.g., having a small memory footprint. In other implementations, the ASR system 120 is implemented, at least in part, by one or more desktop computing devices, one or more servers etc., or any combination thereof.

Figure 2:
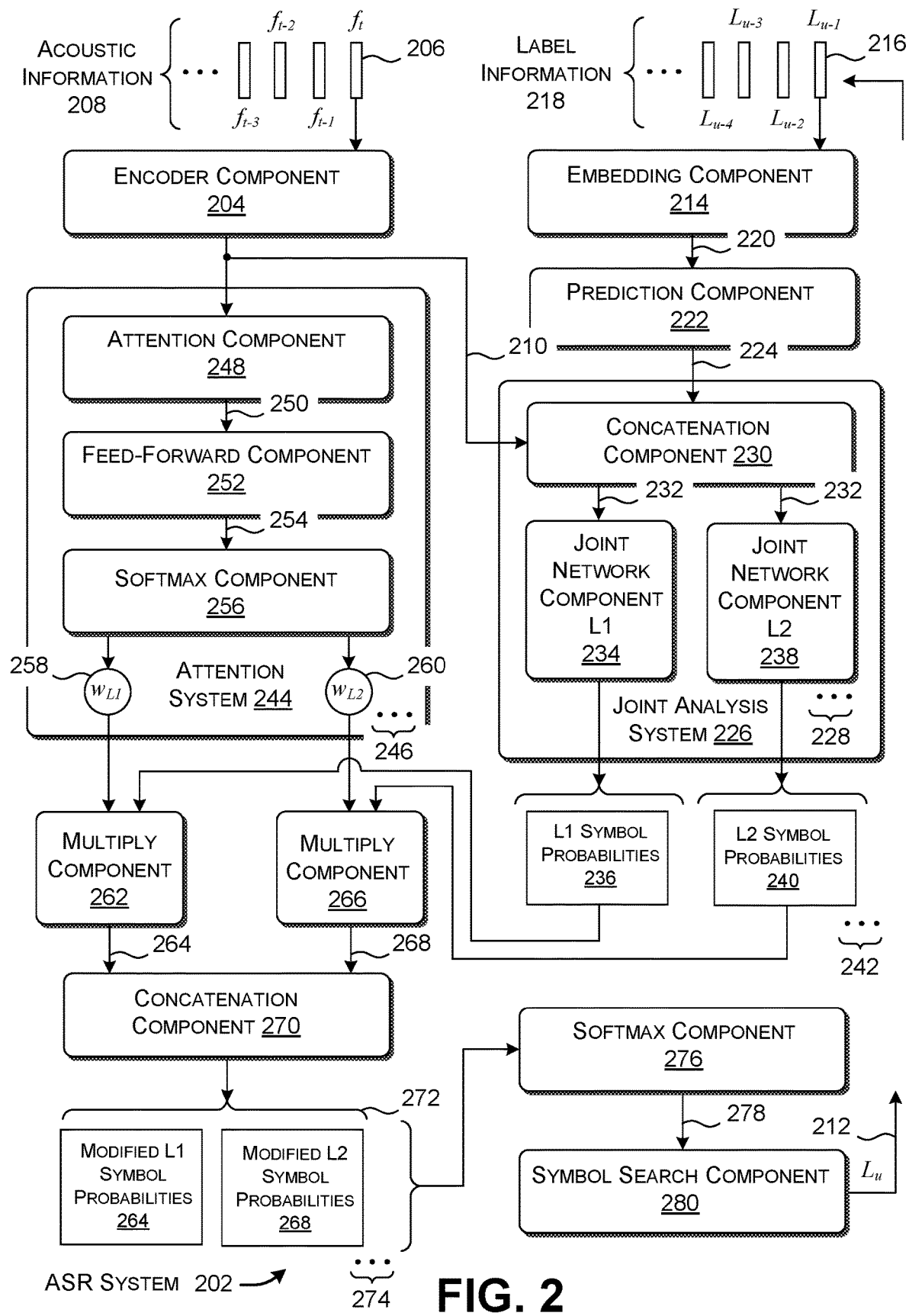
FIG. 2 shows an overview of an automatic speech recognition (ASR) system for use in the computing system of FIG. 1.

FIG. 2 shows one implementation of an automatic speech recognition (ASR) system 202 for use in the computing system 102 of FIG. 1. That is, the ASR 202 is an instantiation of the ASR system 120 introduced in FIG. 1. In some implementations, the ASR systems 202 is implemented as an end-to-end neural network. The illustrative components shown in FIG. 2 represent different parts of the neural network. The neural network, in turn, operates based on the machine-trained model 128 produced by the training system 126 (of FIG. 1). The neural network is referred to as an "end-to-end" system because it relies on the machine-trained model 128 to perform all aspects of the task of speech recognition, e.g., rather than using a collection of separately configured subsystems used by hybrid ASR system (such as a separately trained acoustic model, a separately trained language model, etc.).

The ASR system 202 includes an encoder component 204 that receives an instance of acoustic information 206. The instance of acoustic information 206 represents a current instance (occurring at time $t_n$) in a temporal series of instances of acoustic information 208 (occurring at times $t_n$, $t_{n-1}$, $t_{n-2}$, etc). In some implementations, the instances of acoustic information 208 correspond to frames of feature information generated by the feature-extraction component 114 (of FIG. 1), converted into respective feature vectors. The encoder component 204 maps the instance of acoustic information 206 to encoded acoustic information 210. As will be described in greater detail below, the encoder component 204 can perform its mapping function using any type of neural network, such as a recurrent neural network (RNN), a transformer-based neural network, a convolutional neural network (CNN), a feed-forward neural network, etc., or any combination thereof.

The goal of the ASR system 202 is to predict an updated instance of label information 212 ($L_u$) that describes the instance of acoustic information 206 received by the encoder component 204. That is, the instance of label information 212 describes a unit of speech that is most likely conveyed by the instance of acoustic information 206. The unit of speech, in turn, may correspond to a grapheme, a phoneme, an n-gram, a text fragment detected by the WordPiece segmentation algorithm, an entire word, etc.

An embedding component 214 receives a prior instance of label information 216) that has most recently been predicted by the ASR system 202. For example, assume that the current instance of acoustic information 206 fed to the encoder component 204 occurs at time $t_n$, then the prior instance of label information 216 fed to the embedding component 214 may represent an instance of label information $L_{u-1}$ generated by the ASR system 202 at time $t_{n-1}$. However, if the instance of label information generated at time $t_{n-1}$ is blank (e.g., because it represents a period of silence in the input speech), then the prior instance of label information 216 fed to the embedding component 214 is the most recent instance of non-blank label information predicted by the ASR system 202. For example, the prior instance of label information 216 may represent an instance of non-blank label information predicted by the ASR system 202 at time $t_{n-2}$ if that instance of label information happens to be non-blank. More generally, the prior instance of label information 216 is the most recent non-blank instance of label information in a series of non-blank instances of label information 218 $L_{u-2}$, $L_{u-3}$ etc.). Note that the instances of label information 218 fed to the embedding component 214 lag the instances of acoustic information 208 fed to the encoder component 204 by at least one prediction cycle.

The embedding component 214 maps the prior instance of label information 216 to embedded label information 220 using any type of neural network, such as a neural network layer that performs a linear transformation using machine-trained weights. More specifically, assume that the prior instance of label information 216 corresponds to a one-hot vector having a "1" entry in a slot associated with the linguistic unit it represents, and "0" entries in other dimensions of the vector. The embedding component 214 can linearly transform this one-hot vector into the embedded label information 220, corresponding to a distributed vector having any dimensionality (e.g., 512).

A prediction component 222 maps the embedded label information 220 produced by the embedding component 214 into prediction information 224. The prediction component 222 can perform its mapping function using any type of neural network, such as a RNN, a transformer-based neural network, a CNN, a feed-forward neural network, etc., or any combination thereof. Generally note that the encoder component 204 is a counterpart of an acoustic model in a hybrid ASR system, while the prediction component 222 is the counterpart of a language model in the hybrid ARS system.

A joint analysis system 226 performs analysis on the encoded acoustic information 210 and the prediction information 224 for at least a first language (L1) and a second language (L2). More generally, as indicated by the ellipsis 228, the joint analysis system 226 can perform its analysis with respect to any two or more languages. Note that the encoder component 204, embedding component 214, and prediction component 222 are language-agnostic components in the sense that they use the same neural network functionality to process all input information, regardless of the language in which the input information is expressed. On the other hand, the joint analysis system 226 is a language-specific component because it devotes particular subcomponents to producing output information for different respective languages.

More specifically, the joint analysis system 226 includes a concatenation component 230 that concatenates the encoded acoustic information 210 with the prediction information 224, to produce combined information 232. A first joint network component 234 maps the combined information 232 into probabilities 236 associated with symbols of a first language (L1), while a second joint network component 238 maps the combined information 232 into probabilities 240 associated with symbols of the second language (L2). The ellipsis 242 indicates that the joint analysis system 226 is capable of producing additional probabilities for symbols associated with yet other languages.

More specifically, assume that that the first language (L1) is English having a first set of symbols (e.g., graphemes) associated therewith, and that the second language (L2) is Hindi having a second set of symbols (e.g., graphemes) associated therewith. The first set of probabilities 236 describes, for each possible English symbol, the probability that the instance of acoustic information 206 corresponds to that particular English symbol. The second set of probabilities 240 describes, for each possible Hindi symbol, the probability that the instance of acoustic information 206 corresponds to that particular Hindi symbol.

An attention system 244 determines the probability that the instance of acoustic information 206 expresses a symbol in the first language (e.g., English) or the second language (e.g., Hindi). The ellipsis 246 indicates that, more generally, the attention system 244 can determine the probability that the instance of acoustic information 206 corresponds to any of two or more languages. In one implementation, the attention system 244 includes an attention component 248 that performs self-attention analysis using the following equation:

$$attn(Q, K, V) = \text{softmax}\left(\frac{QK^T}{\sqrt{d}} + B\right)V. \quad (1)$$

The attention component 248 produces query information Q by multiplying input vectors associated with the different encoded instances of acoustic information 208 produced by the encoder component 204 (including the encoded instance of the current acoustic information 206) by a query weighting matrix $W^Q$. The attention component 248 produces key information K and value information V by multiplying the same input vectors by a key weighting matrix $W^K$ and a value weighting matrix $W^V$, respectively. To execute Equation (1), the attention component 248 takes the dot product of Q with the transpose of K, and then divides that dot product by a scaling factor $\sqrt{d}$; the symbol d represents the dimensionality of the machine-learned model 128 that implements the ASR system 202. The attention component 248 adds a position matrix B to the result of the division, and then takes the softmax (normalized exponential function) of the resultant sum. The position matrix B expresses the position of each instance of acoustic information under consideration with respect to every other instance of acoustic information. The attention component 248 multiples the result of the softmax operation by V, to produce attention output information 250. Background information regarding the general concept of attention is provided in VASWANI, et al., "Attention Is All You Need," in 31st Conference on Neural Information Processing Systems (NIPS 2017), 2017, 11 pages.

More generally stated, the attention component 248 determines the importance of each acoustic frame under consideration with respect to every other acoustic frame, in an identified set of consecutive acoustic frames. The attention component 248 learns to attribute importance to events within a stream of acoustic frames that are likely of value in determining the languages used in an utterance. For example, the attention component 248 learns to detect events that signal the transition from one language to another.

A feed-forward neural network (FNN) component 252 maps the attention output information 250 into FFN output information 554. The FFN component 252 can be implemented using any number of layers of neurons that use any type of activation function. A softmax component 256 maps the FFN output information 254 into a vector that provides a first weight 258 ($w_{L1}$) that indicates the probability that the instance of acoustic information 206 represents a symbol in the first language (e.g., English), and a second weight 260 ($w_{L2}$) that indicates the probability that the instance of acoustic information 206 represents a symbol in the second language (e.g., Hindi). If the ASR system 202 was configured to handle seven languages (for instance), the softmax component 256 would map the FFN output information 254 into a vector that expresses probabilities of the seven languages. In all cases, the probabilities expressed in the vector generated by the softmax component 256 sum to 1.0.

A multiply component 262 multiples the first weight 258 by the first-language probabilities 236 for symbols in the first language (e.g., English), to produce modified first-language probabilities 264. A multiply component 266 multiplies the second weight 260 by the second-language probabilities 240 for symbols in the second language (e.g., Hindi), to produce modified second-language probabilities 268. A concatenation component 270 concatenates the modified first-language probabilities 264 with the modified second-language probabilities 268, to produce concatenated language probabilities 272. An ellipsis 274 indicates that the concatenated language probabilities 272 can include additional modified language probabilities for the case in which the ASR system 202 is configured to process three or more languages. A softmax component 276 normalizes the probabilities in the concatenated language probabilities 272 such that they sum to 1.0. This yields final probability information 278.

A symbol search component 280 applies a search heuristic to determine the label information 212 based on the final probability information 278. That is, in some instances, the symbol search component 280 results in the generation of label information 212 ($L_u$) that represents the single most likely first-language or second-language symbol that is conveyed by the instance of acoustic information 206. In other instances (not shown), the symbol search component 280 generates label information that represents the k≥2 most like symbols. Although not shown, the ASR system 202 can subsequently perform processing on each of the most likely symbols identified by the symbol search component 280. The operation of the symbol search component 280 will be described in greater detail below with reference to FIG. 4.

Figure 3:
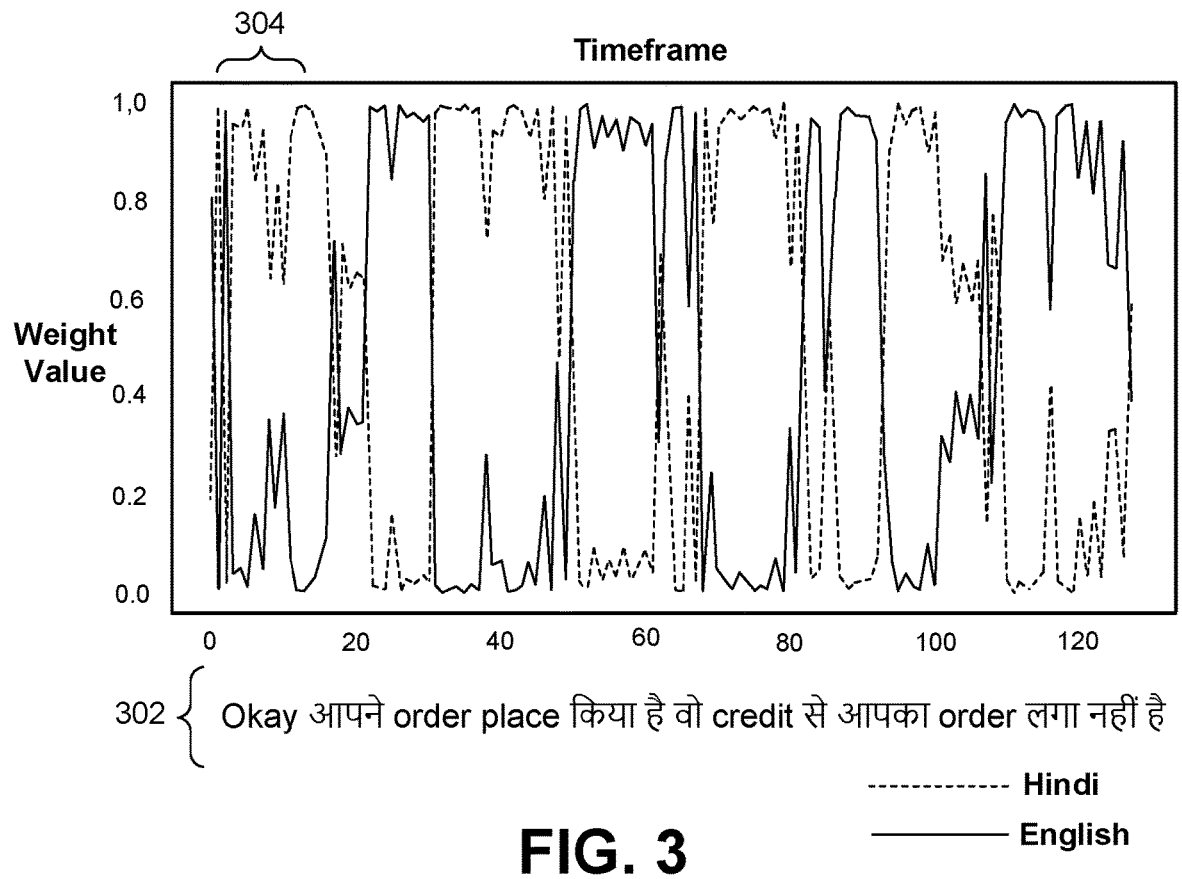
FIG. 3 shows an example of weighting information produced by the ASR system of FIG. 2.
Figure 5:
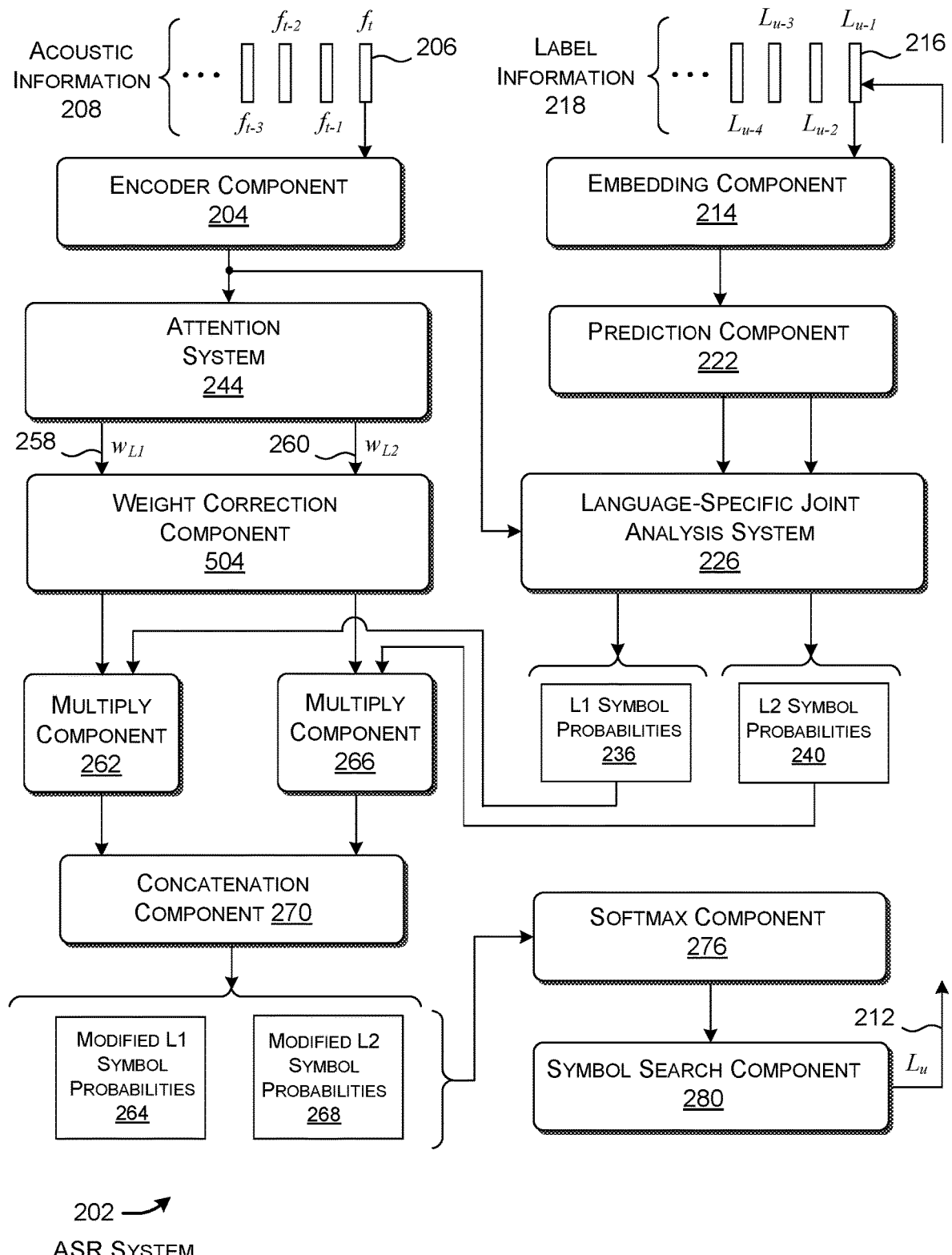
FIG. 5 shows another implementation of the ASR system of FIG. 2. This ASR system introduces a weight correction component not shown in FIG. 2.

FIG. 3 shows an example of weighting information produced by the attention system 244 of the ASR system 202 of FIG. 2 for a particular utterance 302. More specifically, the dashed line in that figure illustrates variations of the first weight 258, associated with the English language, over the course of processing the frames of the utterance 302. The solid line illustrates variations of the second weight 260, associated with the Hindi language, over the course of processing the frames of the utterance 302. Generally note that the first weight 258 is high during times at which frames associated with English words are being processed, and the second weight 260 is high during times at which frames associated with Hindi words are being processed. At any given time, the first weight 258 and the second weight 260 sum to 1.0. The weighting information can include regions of high fluctuation in weighting values, such as in region 304 at the beginning of the utterance 302. FIG. 5, to be described below, includes functionality that is designed to reduce this kind of dramatic change in weight values.

Figure 4:
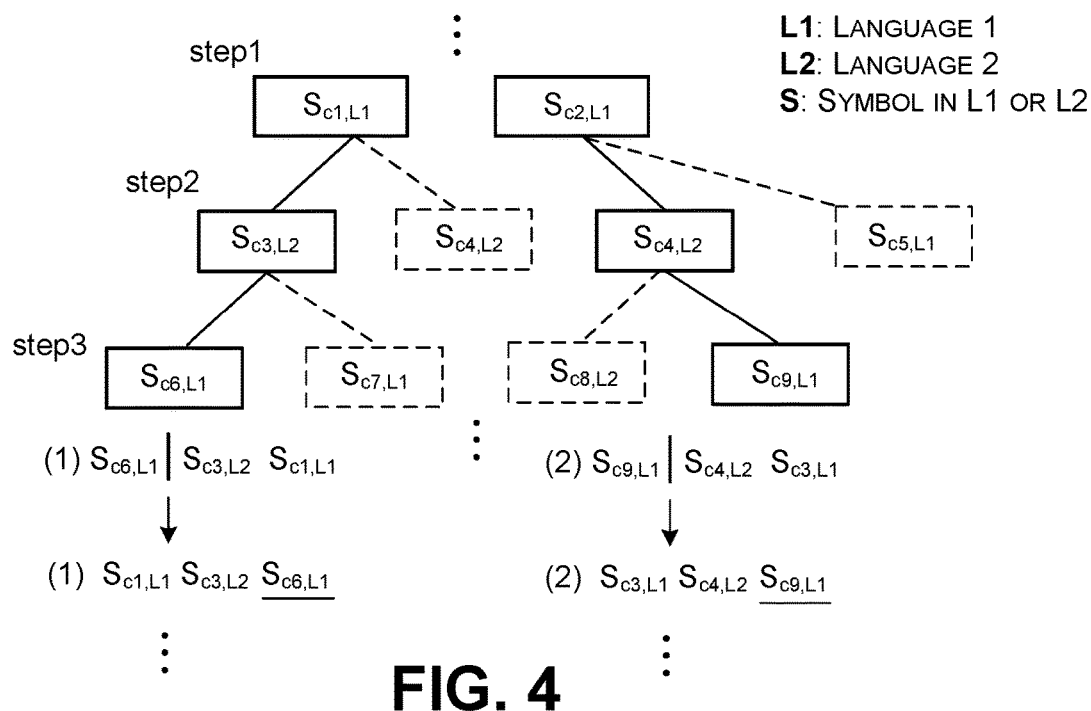
FIG. 4 shows an example of a beam search operation performed by the ASR system of FIG. 2.

FIG. 4 shows an example of a search operation performed by the symbol search component 280 of the ASR system 202 of FIG. 2. Different implementations of the symbol search component 280 can apply different search heuristics based on the final probability information 278. In a greedy search heuristic, the symbol search component 280 will choose a single symbol having the highest probability, selected from among the entire universe of symbols in the first language and the second language. In other word, if the highest probability in the final probability information 278 corresponds to an English symbol, the symbol search component 280 outputs label information 212 that describes that English symbol. Alternatively, if the highest probability in the final probability information 278 corresponds to a Hindi symbol, the symbol search component 280 outputs label information 212 that describes that Hindi symbol.

On the other hand, in a beam search algorithm, the symbol search component 280 determines k candidate symbols each time it is invoked for a given starting point within a search tree, where k>1 defines a beam width. The beam search algorithm determines the likelihood of a particular candidate symbol as a conditional probability, taking into account both a current probability of the particular candidate symbol (obtained from the final probability information 278) and the probabilities of the symbols in a search path that leads to that particular candidate symbol.

For example, at a first prediction pass (step 1), assume that the symbol search component 280 determines that candidate symbol $S_{c1,L1}$ and candidate symbol $S_{c2,L1}$ have the highest probability. The notations c1 and c2 in the subscripts denote first and second candidate symbols, respectively. The notation L1 in the subscripts indicates that each candidate symbol is expressed in the first language (L1). In a second prediction pass (step 2), the ASR system 202 generates final probability information 278 for the first candidate symbol $S_{c1,L1}$ and final probability information 278 for the second candidate symbol $S_{c2,L1}$. With respect to the first of these candidate symbols ($S_{c1,L1}$), the symbol search component 280 then determines the conditional probability of each possible symbol in the first and second languages, given the presumed occurrence of the candidate token $S_{c1,L1}$ determined in step 1. Assume that the symbol search component 280 concludes that the two most likely symbols to follow the candidate symbol $S_{c1,L1}$ are the candidate symbol $S_{c3,L2}$ and the candidate symbol $S_{c4,L2}$. Likewise, the symbol search component 280 determines the conditional probability of each possible symbol in the first language and the second languages, given the presumed occurrence of the candidate token $S_{c2,L1}$ determined in step 1. Assume that the symbol search component 280 determines that the two most likely symbols to follow the candidate symbol $S_{c2,L1}$ are the candidate symbol $S_{c4,L2}$ and the candidate symbol $S_{c5,L1}$ (respectively). The symbol search component 280 then selects the two symbol candidates having the highest conditional probabilities from among the above-noted four candidate symbols. In the example of FIG. 4, the symbol search component 280 concludes that the symbols $S_{c3,L2}$ and $S_{c4,L2}$ have the highest conditional probabilities. The symbol search component 280 repeats the above process one or more times until it reaches a termination condition, such as the detection of end-of-sequence symbols.

Note that, each time it is invoked, the symbol search component 280 performs a single search over the search space that includes all possible symbols in the set of languages under consideration. This allows the symbol search component 280 to use a single search process to construct a sequence of symbols that are potentially drawn from different languages. When processing an utterance in a single language, the symbol search component 280 will draw mostly from the symbols associated with that single language. The symbol search component 280 might choose a symbol from another language due to various factors, such as confusion as to a vocal sound made by the user in his or her utterance.

FIG. 5 shows another implementation of an ASR system 502. The ASR system 502 is the same as the ASR system 202 shown in FIG. 2, except for the introduction of a weight correction component 504, which was not used in the ASR system of FIG. 2. All other components perform the same roles as their counterpart components in FIG. 2. That is, components in FIGS. 2 and 5 that have the same names and reference numerals perform the same respective functions.

The purpose of the weight correction component 504 is to smooth the weighting information output by the attention system 244 over the course time. This has the effect of reducing large abrupt transitions in weighting values across time. For example, again refer to the abrupt swings in weighting values in the region 304 of FIG. 3. A transition among languages should occur when transitioning from a first-language word to a second-language word in the utterance 302. But in the vast majority of times, large transitions should not properly be observed between frames associated with the single word. It is therefore unlikely that rapid transitions on a sub-word level are correct. To address this issue, the weight correction component 504 reduces the occurrence of such large sub-word transitions. The operation of the weight correction component 504 improves the quality of the label information produced by the symbol search component 280. This is because the weight correction component 504 reduces the amount of incongruous probability information that is fed to the symbol search operation.

Consider an example in which the attention system 244 produces a stream of weight values for a particular language given by the sequence: {0.8, 0.1, 0.7, 0.2, 0.6, 0.7, 0.8, 0.9, 0.9}. The weight values 0.1 and 0.2 in this sequence are likely to be incorrect. The weight correction component 504 can address this issue by increasing weight values at these positions based the weight values that neighbor these positions.

The weight correction component 504 can smooth a stream of weight values using various filters, algorithms, rules, and/or machine-trained models. For example, the weight correction component 504 can smooth a stream of weight values using a moving average filter, any type of momentum-based algorithm, etc. Alternatively, or addition, the weight correction component 504 can apply a rule which clamps a change in weight values from one frame to another to a predetermined weight (e.g., 0.5), upon determining that the change is above a prescribed threshold value.

Figure 6:
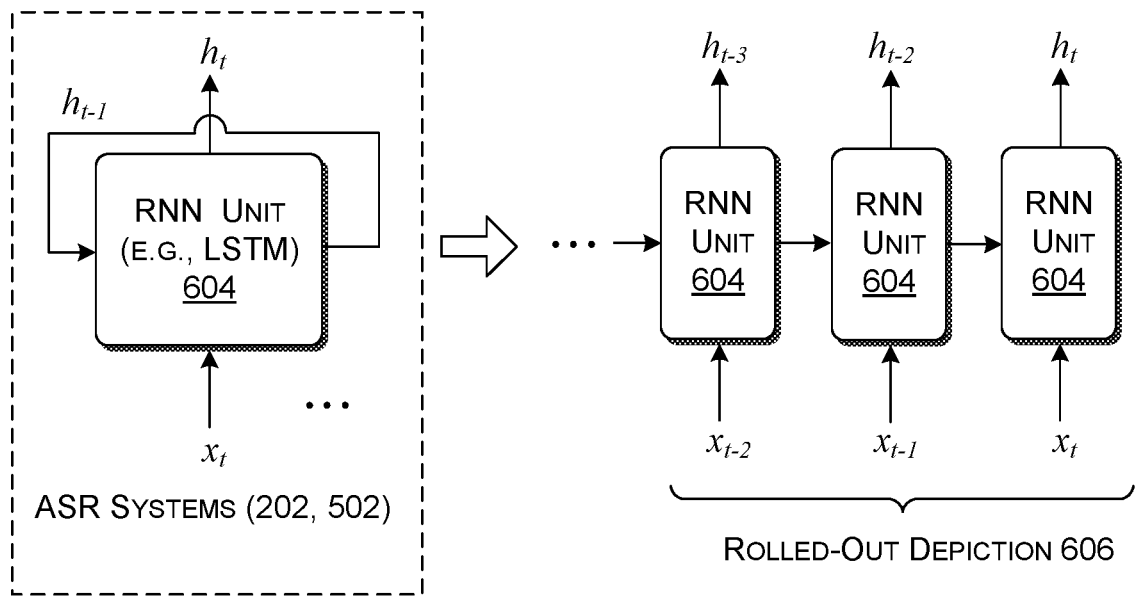
FIG. 6 shows an example of recurrent neural network (RNN) technology that can be used to build parts of the ASR systems of FIGS. 2 and 5.

FIG. 6 shows an example of recurrent neural network (RNN) technology 602 that can be used to build parts of the ASR systems (202, 502) of FIGS. 2 and 5. For example, the RNN technology 602 can be used to implement the encoder component 204 and/or the prediction component 222. The RNN technology 602 includes an RNN unit 604 that is invoked at different time steps. At each time t, the RNN unit 604 receives an instance of input information $x_t$, such as the instance of acoustic information 206. It maps the input information $x_t$ to hidden state information $h_t$ based on hidden state information $h_{t-1}$ generated at a prior instance of time (t−1) for a prior instance of input information $x_{t-1}$. In one implementation, the RNN unit 604 can be implemented as a long short-term memory (LSTM) unit, a gate recurrent unit (GRU), etc.

FIG. 6 also shows a "rolled-out" depiction 606 of the RNN unit 604, e.g., which illustrates the operation of the RNN unit 604 over plural time steps. More specifically, the rolled-out depiction 606 shown in FIG. 6 corresponds to a unidirectional implementation of the RNN technology 602 in which hidden state information flows between RNN units from left to right. In addition to the left-to-right dependency shown in FIG. 6, the RNN technology 602 can stack plural layers of the RNN unit 604 (not shown). In other implementations, the RNN technology 602 is implemented using a bidirectional connection of RNN units in which hidden state information is passed from both left to right and right to left. In still other implementations, the RNN technology 602 is implemented as a latency-controlled bidirectional RNN. The use of bidirectional RNNs allows the encoder component 204 to perform look-ahead in its processing of the instances of input information under consideration, e.g., by taking into account at least some instances of acoustic information that temporally follow an instance of acoustic information under consideration.

Figure 7:
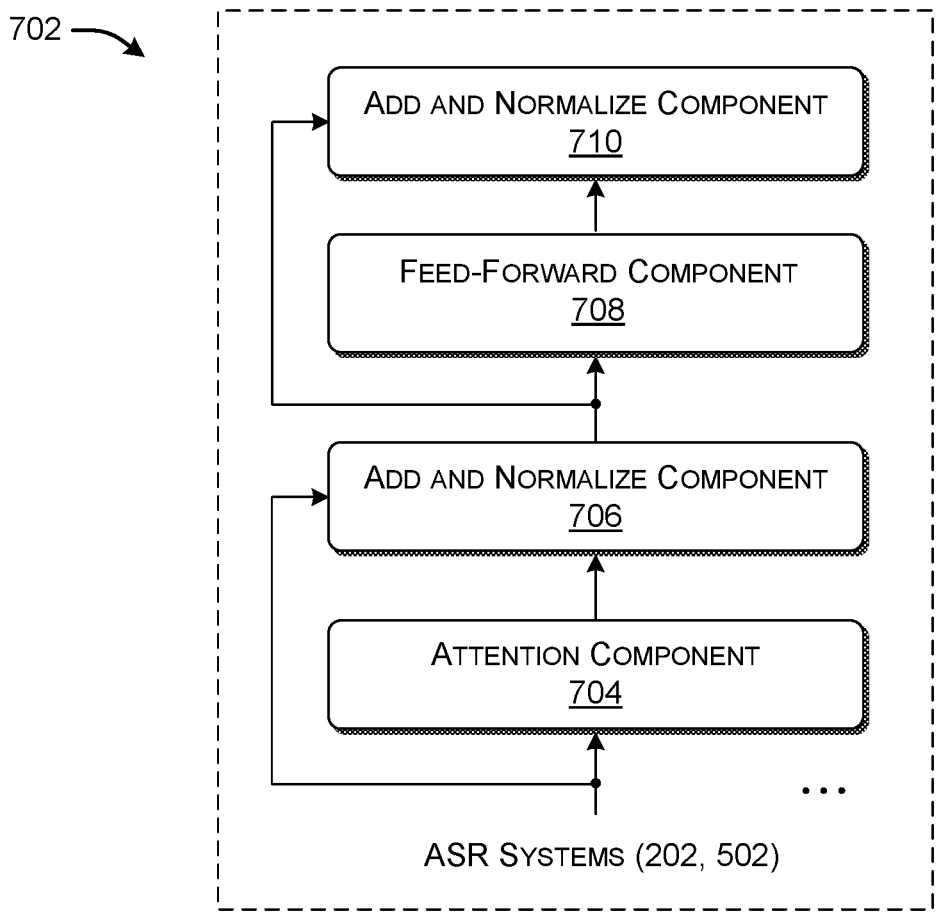
FIG. 7 shows an example of transformer-based technology that can be used to build parts of the ASR systems of FIGS. 2 and 5.

FIG. 7 shows an example of transformer-based technology 702 that can be used to build parts of the ASR systems (202, 502) of FIGS. 2 and 5. For example, the transformer-based technology 702 can be used to implement the encoder component 204 and/or the prediction component 222. The transformer-based technology 702 is a pipeline of components that includes an attention component 704, an add-and-normalize component 706, a feed-forward network (FNN) component 708, and another add-and-normalize component 710. Although not shown, the transformer-based technology can further stack plural layers of this pipeline. The attention component 704 performs attention analysis based on Equation (1) for one or more attention heads (corresponding to different representative subspaces). The add-and-normalize component 706 includes a residual connection that combines (e.g., sums) input information fed to the attention component 704 with the output information generated by the of the attention component 704. The add-and-normalize component 706 then performs a layer normalization operation on the output information generated by of the residual connection, e.g., by normalizing values in the output information based on the mean and standard deviation of those values. The FNN component 708 transforms input information to output information using any number of layers of neurons, each of which can use any activation function. The other add-and-normalize component 710 performs the same functions as the first-mentioned add-and-normalize component 706. Like the RNN technology 602 described above, the transformer-based technology 702 can perform look-ahead to take account of instances of input information that occur after the occurrence of a particular instance of input information under consideration.

Returning momentarily to FIG. 1, the training system 126 can train the machine-trained model 128 used by the ASR system 202 in three phases. In a first phrase, the training system 126 trains the ASR system 202 without the inclusion of the attention system 244. In this phase, the training system 126 can operate on training examples including utterances expressed in different languages (but not code-mixed utterances). In a second phase, the training system 126 trains just the attention system 244. In this phase, the training system 126 can operate on monolingual utterances in different languages and code-mixed utterances. In a third phase, the training system 126 trains the entire ASR system 202 including the now-trained attention system 244. In this phase, the training system 126 can operate on monolingual utterances in different languages and code-mixed utterances. In some implementations, the training system 126 omits the weight correction component 504 (of FIG. 5) in all phases of training. That is, in these implementations, the weight correction component 504 is only used in the inference (i.e., application) stage. In other implementations, the weight correction component 504 is part of the machine-trained functionality trained by the training system 126.

More generally, in training the ASR system 202, the training system 126 feeds sample utterances to the ASR system 202, which results in the generation of predicted transcripts. The training system 126 attempts to iteratively minimize the errors between the predicted transcripts and ground-truth transcripts associated with the sample utterances. To facilitate this comparison, the ground-truth transcripts are produced such that words in different languages are expressed in native scripts associated with those languages. For example, a ground-truth transcript for an utterance that includes both Hindi and English words includes the Hindi words expressed the Devanagari script and English words expressed in Latin characters. As a result of this training, the ASR system 202 can learn to produce transcripts that contain appropriate scripts for words, e.g., by expressing a Hindi word in the Devanagari script and an English word in Latin characters. The above-described manner of training is distinct from other techniques which transform each code-mixed utterance to a single language, e.g., by using transliteration to convert a Hindi word to its Latin-character counterpart, or vice versa. If a training set does not already include code-mixed utterances that contain words in the appropriate native scripts, the training system 126 can convert the original code-mixed utterances into a more appropriate form, e.g., by performing a dictionary lookup operation and a substitution operation.

The training system 126 can train the attention system 244 by itself by processing a collection of sample utterances in the training set using the attention system 244. The training system 126 attempts to iteratively minimize the errors between the weighting information generated by the attention system 244 and ground-truth weighting information associated with the sample utterances. The ground-truth weighting information describes, for each symbol of an utterance, its correct language.

In conclusion to Section A, the ASR systems (202, 502) described herein has a number of technical merits. According to one advantage, the ASR systems (202, 502) can successfully translate utterances that combine words expressed in different languages without requiring a user to manually specify, a priori, the languages that are being spoken. The ASR systems (202, 502) also avoid the need for complex algorithms and machine-trained models to switch between different monolingual machine-trained models during processing of an utterance that is expressed in different languages.

According to another technical advantage, the ASR systems (202, 502) produce accurate label information for various input scenarios, including the case which a user's utterance combines words in two or more different languages. More specifically, the ASR systems (202, 502) exhibits a word error rate (WER) that is approximately seven percent better than some conventional multilingual models. For example, in another approach, a multilingual ASR system can be built by pooling utterances expressed in different natural languages, and learning a single end-to-end machine-trained model based on this pooled dataset. This kind of ASR system that uses a pooled dataset produces less accurate results compared to the ASR systems (202, 502) described herein, which combine language-agnostic components with language-specific components.

According to another technical advantage, the ASR systems (202, 502) use relatively small machine-trained models, which enables them to run on resource-constrained computing platforms, such as mobile user computing devices. One factor contributing the smaller size of the machine-trained models is their use of a language-agnostic encoder component 204 and a language-agnostic prediction component 222. That is, the use of the language-agnostic encoder component 204 and the language-agnostic prediction component 222 helps reduce the size of the machine-trained model 128 because it avoids the use of separate language-specific encoder components and language-specific prediction components. While the joint analysis system 226 uses language-specific joint network components (e.g., 234, 238), these components are smaller than language-specific encoder components and language-specific prediction components. As used herein, reference to "size" can reflect the number of parameter values used by the machine-trained models. The size of a model impacts the amount of memory and other computing resources it requires to run on a device.

According to another technical advantage, the ASR systems (202, 502) achieve good latency-related performance because they use a single search algorithm to search through all the potential symbols in two or more languages. This is in comparison with an alternative architecture which devotes separate symbol search components for performing searches for different respective languages, and then merging the results of the separate searches together. This factor may also contribute to the relatively small size of the machine-trained models used by the ASR systems (202, 502).

According to another technical advantage, the ASR system 502 improves the quality of its output results by reducing abrupt transitions in weighting values produced by the attention system 244.

According to another technical advantage, the ASR system 502 can produce output information in which words in languages are expressed in the native scripts associated with those languages. This kind of output information more readily conforms to the expectations of users, insofar as it conforms to how the users would manually transcribe their utterances if asked to do so.

The above technical advantages are cited by way of example, not limitation.

B. Illustrative Processes

Figure 8:
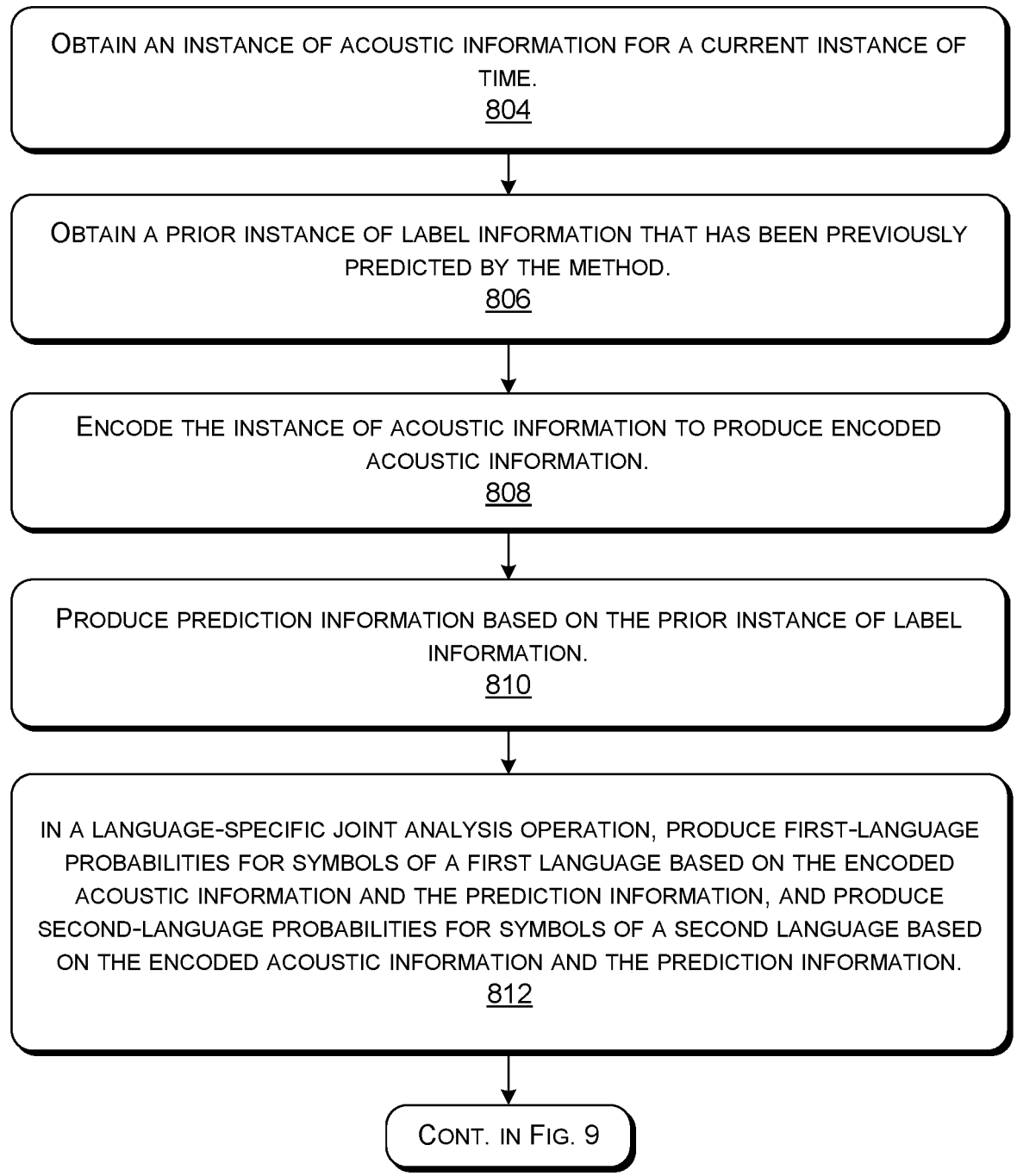

FIGS. 8-10 show processes that explain the operation of the ASR systems (202, 502) of Section A in flowchart form, according to some implementations. Since the principles underlying the operation of the ASR systems (202, 502) have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In some implementations, the blocks shown in the flowcharts that pertain to processing-related functions are implemented by the hardware logic circuitry described in Section C, which, in turn, can be implemented by one or more hardware processors and/or other logic units that include a task-specific collection of logic gates.

FIGS. 8 and 9 together show a process 802, implemented by the computing system 102 of FIG. 1, for recognizing speech. In block 804, the computing system 102 obtains an instance of acoustic information 206 for a current instance of time. In block 806, the computing system 102 obtains a prior instance of label information 216 that has been previously predicted by the process 802. In block 808, the computing system 102 encodes the instance of acoustic information 206 to produce encoded acoustic information 210. In block 810, the computing system 102 produces prediction information 224 based on the prior instance of label information 216. In block 812, in a language-specific joint analysis operation, the computing system 102 produces first-language probabilities 236 for symbols of a first language (L1) based on the encoded acoustic information 210 and the prediction information 224, and produces second-language probabilities 240 for symbols of a second language (L2) based on the encoded acoustic information 210 and the prediction information 224.

In block 902 of FIG. 9, in a weight-generating operation, the computing system 102 produces weighting information for the first language and the second language based on the encoded acoustic information. The weighting information includes a first weight 258 that indicates a likelihood that the instance of acoustic information 206 is expressed in the first language, and a second weight 260 that indicates a likelihood that the instance of acoustic information is expressed in the second language. In optional block 904, the computing system 102 smooths the weighting information produced in block 902 based on previously-generated weighting information. In block 906, in a weight modification operation, the computing system 102 modifies the first-language probabilities 236 by the first weight 258, to produce modified first-language probabilities 264, and modifies the second-language probabilities 240 by the second weight 260, to produce modified second-language probabilities 268. In block 908, the computing system 102 predicts an updated instance of label information 212 based on the modified first-language probabilities 264 and the modified second-language probabilities 268.

FIG. 10 shows a process 1002 that describes one technique by which the training system 126 can train the machine-trained model 128 that governs the operation of the ASR systems (202, 502). In block 1004, the training system 126 trains a version of the model 128 that omits model functionality that performs the weight-generating operation (of block 902 of FIG. 9). In the implementations of FIGS. 2 and 5, the model functionality that performs the weight-generating operation is the attention system 244. In block 1006, the training system 126 separately trains the model functionality that performs the weight-generating operation. In block 1008, the training system 126 trains a version of the model 128 that includes the model functionality that performs the weight-generating operation, as trained by block 1006.

C. Representative Computing Functionality

FIG. 11 shows an example of computing equipment that can be used to implement any of the systems summarized above. The computing equipment includes a set of user computing devices 1102 coupled to a set of servers 1104 via a computer network 1106. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 2206 can be implemented as a local area network, a wide area network (e.g., the Internet), one or more point-to-point links, or any combination thereof.

FIG. 11 also indicates that the ASR systems (202, 502) and the training system 126 can be spread across the user computing devices 1102 and/or the servers 1104 in any manner. For instance, in some cases, an ASR system is entirely implemented by one or more of the servers 1104. Each user may interact with the servers 1104 via a user computing device. In other cases, an ASR system is entirely implemented by a user computing device in local fashion, in which case no interaction with the servers 1104 is necessary. In another case, the functionality associated with an ASR system is distributed between the servers 1104 and each user computing device in any manner.

Figure 12:
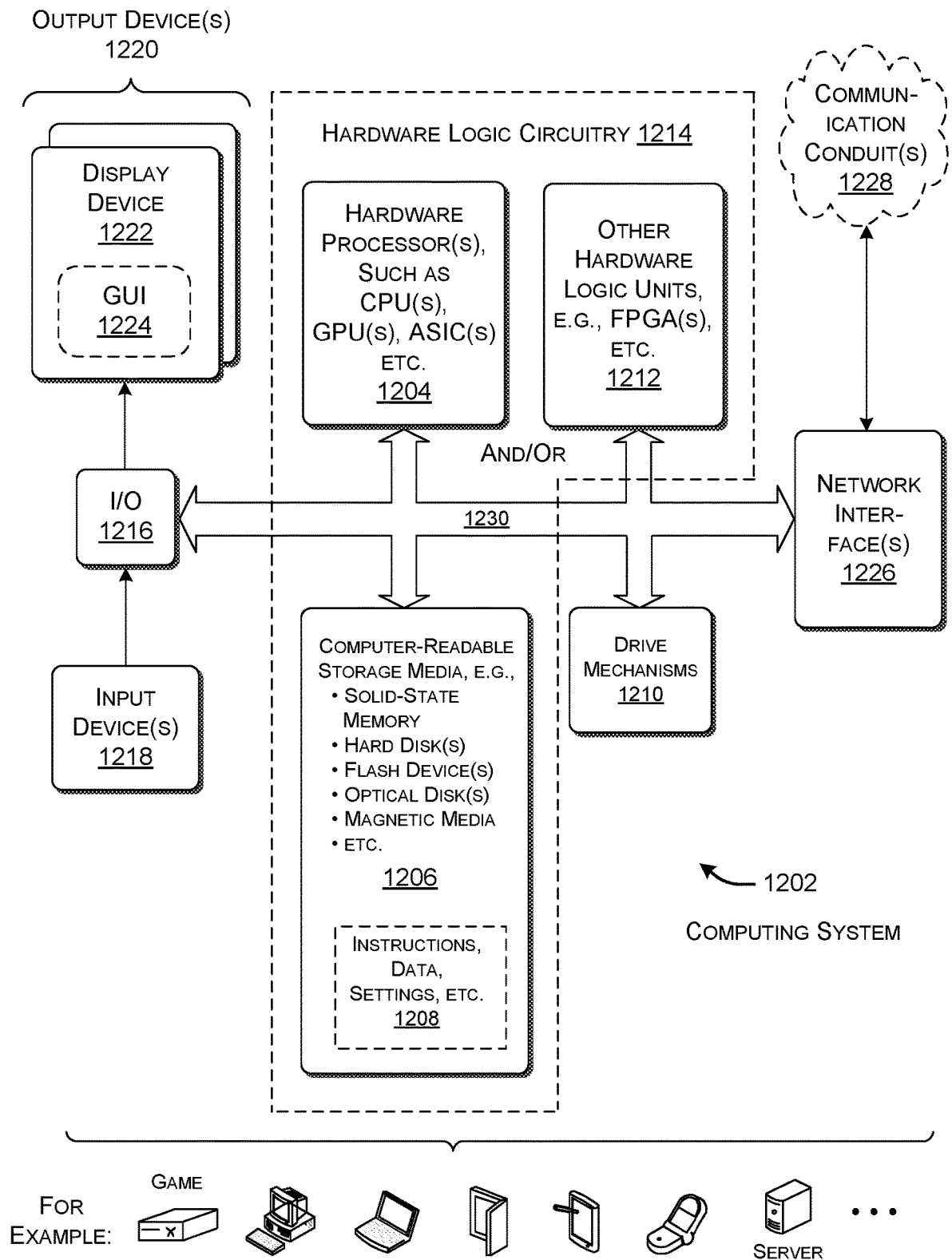
FIG. 12 shows an illustrative type of computing system that can be used to implement any aspect of the features shown in the foregoing drawings.

FIG. 12 shows a computing system 1202 that can be used to implement any aspect of the mechanisms set forth in the above-described figures. For instance, the type of computing system 1202 shown in FIG. 12 can be used to implement any user computing device or any server shown in FIG. 11. In all cases, the computing system 1202 represents a physical and tangible processing mechanism.

The computing system 1202 can include one or more hardware processors 1204. The hardware processor(s) 1204 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 1202 can also include computer-readable storage media 1206, corresponding to one or more computer-readable media hardware units. The computer-readable storage media 1206 retains any kind of information 1208, such as machine-readable instructions, settings, data, etc. Without limitation, the computer-readable storage media 1206 may include one or more solid-state devices, one or more magnetic hard disks, one or more optical disks, magnetic tape, and so on. Any instance of the computer-readable storage media 1206 can use any technology for storing and retrieving information. Further, any instance of the computer-readable storage media 1206 may represent a fixed or removable unit of the computing system 1202. Further, any instance of the computer-readable storage media 1206 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1202 can utilize any instance of the computer-readable storage media 1206 in different ways. For example, any instance of the computer-readable storage media 1206 may represent a hardware memory unit (such as Random Access Memory (RAM)) for storing information during execution of a program by the computing system 1202, and/or a hardware storage unit (such as a hard disk) for retaining/archiving information on a more permanent basis. In the latter case, the computing system 1202 also includes one or more drive mechanisms 1210 (such as a hard drive mechanism) for storing and retrieving information from an instance of the computer-readable storage media 1206.

The computing system 1202 may perform any of the functions described above when the hardware processor(s) 1204 carry out computer-readable instructions stored in any instance of the computer-readable storage media 1206. For instance, the computing system 1202 may carry out computer-readable instructions to perform each block of the processes described in Section B.

Alternatively, or in addition, the computing system 1202 may rely on one or more other hardware logic units 1212 to perform operations using a task-specific collection of logic gates. For instance, the hardware logic unit(s) 1212 may include a fixed configuration of hardware logic gates, e.g., that are created and set at the time of manufacture, and thereafter unalterable. Alternatively, or in addition, the other hardware logic unit(s) 1212 may include a collection of programmable hardware logic gates that can be set to perform different application-specific tasks. The latter class of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 12 generally indicates that hardware logic circuitry 1214 includes any combination of the hardware processor(s) 1204, the computer-readable storage media 1206, and/or the other hardware logic unit(s) 1212. That is, the computing system 1202 can employ any combination of the hardware processor(s) 1204 that execute machine-readable instructions provided in the computer-readable storage media 1206, and/or one or more other hardware logic unit(s) 1212 that perform operations using a fixed and/or programmable collection of hardware logic gates. More generally stated, the hardware logic circuitry 1214 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 1214 that performs a particular function or combination of functions.

In some cases (e.g., in the case in which the computing system 1202 represents a user computing device), the computing system 1202 also includes an input/output interface 1216 for receiving various inputs (via input devices 1218), and for providing various outputs (via output devices 1220). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 1222 and an associated graphical user interface presentation (GUI) 1224. The display device 1222 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1202 can also include one or more network interfaces 1226 for exchanging data with other devices via one or more communication conduits 1228. One or more communication buses 1230 communicatively couple the above-described units together.

The communication conduit(s) 1228 can be implemented in any manner, e.g., by a local area computer network, a wide area computer network (e.g., the Internet), point-to-point connections, etc., or any combination thereof. The communication conduit(s) 1228 can include any combination of hardwired links, wireless links, routers, gateway functionality, name servers, etc., governed by any protocol or combination of protocols.

FIG. 12 shows the computing system 1202 as being composed of a discrete collection of separate units. In some cases, the collection of units corresponds to discrete hardware units provided in a computing device chassis having any form factor. FIG. 12 shows illustrative form factors in its bottom portion. In other cases, the computing system 1202 can include a hardware logic unit that integrates the functions of two or more of the units shown in FIG. 1. For instance, the computing system 1202 can include a system on a chip (SoC or SOC), corresponding to an integrated circuit that combines the functions of two or more of the units shown in FIG. 12.

The following summary provides a non-exhaustive set of illustrative examples of the technology set forth herein.

(A1) According to a first aspect, some implementations of the technology described herein include a method (e.g., the process 802) for recognizing speech. The method includes: obtaining (e.g., 804) an instance of acoustic information (e.g., 206) for a current instance of time; obtaining (e.g., 806) a prior instance of label information (e.g., 216) that has been previously predicted by the process 802; encoding (e.g., 808) the instance of acoustic information to produce encoded acoustic information (e.g., 210); and producing (e.g., 810) prediction information (e.g., 224) based on the prior instance of label information. In a language-specific joint analysis operation (e.g., 812), the method produces first-language probabilities (e.g., 236) for symbols of a first language (e.g., L1) based on the encoded acoustic information and the prediction information, and producing second-language probabilities (e.g., 240) for symbols of a second language (e.g., L2) based on the encoded acoustic information and the prediction information.

In a weight-generating operation (e.g., 902), the method produces weighting information for the first language and the second language based on the encoded acoustic information, the weighting information including a first weight (e.g., 258) that indicates a likelihood that the instance of acoustic information is expressed in the first language, and a second weight (e.g., 260) that indicates a likelihood that the instance of acoustic information is expressed in the second language. In a weight modification operation (e.g., 906), the method modifies the first-language probabilities by the first weight, to produce modified first-language probabilities (e.g., 264), and modifies the second-language probabilities by the second weight, to produce modified second-language probabilities (e.g., 268). The method predicts (e.g., 908) an updated instance of label information (e.g., 212) based on the modified first-language probabilities and the modified second-language probabilities. The method is performed by one or more neural networks.

Among other technical merits, the method of A1 is capable of handling code-mixed utterances. Further, the method of A1 has a small memory footprint and exhibits good latency-related performance.

(A2) According to some implementations of the method of A1, the speech that is recognized includes an utterance that mixes words in the first language and words in the second language.

(A3) According to some implementations of the method of A1, the speech that is recognized includes an utterance that is expressed in either the first language or the second language.

(A4) According to some implementations of any of the methods of A1-A3, the method is performed for three or more languages.

(A5) According to some implementations of any of the methods of A1-A4, the operation of encoding the instance of acoustic information uses a same encoder machine-trained model for both the first language and the second language.

(A6) According to some implementations of any of the methods of A1-A5, the operation of producing prediction information uses a same machine-trained prediction model for both the first language and the second language.

(A7) According to some implementations of any of the methods of A1-A6, the weight-generating operation involves performing attention analysis based on the encoded acoustic information.

(A8) According to some implementations of any of the methods of A1-A7, the weight-generating operation includes: performing self-attention on the encoded acoustic information to produce attention output information; using a feed-forward neural network (FFN) to map the attention output information to FFN output information; generating the weighting information based on the FFN output information.

(A9) According to some implementations of any of the methods of A1-A8, the method further includes smoothing the weighting information, prior to the weight modification operation, based on previously-generated weighting information.

(A10) According to some implementations of any of the methods of A1-A9, the language-specific joint analysis operation includes, for each particular language: combining the encoded acoustic information with the prediction information, to produce combined information; and mapping the combined information into probabilities for symbols of the particular language.

(A11) According to some implementations of any of the methods of A1-A10, the operation of predicting involves performing a single symbol search operation over symbols of the first language and the second language, based on the modified first-language probabilities and the modified second-language probabilities.

(A12) According to some implementations of any of the methods of A1-A11, the speech of the user mixes words in the first language and words in the second language. The method further includes generating output information that includes the words in the first language expressed in a script that is native to the first language, and the words in the second language expressed in a script that is native to the second language.

(A13) According to some implementations of any of the methods of A1-A12, the method is performed based on a machine-trained model. The machine-trained model is trained by: training a version of the model that omits model functionality that performs the weight-generating operation; separately training the model functionality that performs the weight-generating operation; and training a version of the model that includes the model functionality that performs the weight-generating operation, as trained by the operation of separately training.

(A14) According to some implementations of any of the methods of A1-A13, the method is performed based on a machine-trained model. The machine-trained model is trained based on a collection of utterances that include words in the first language expressed in a script that is native to the first language, and words in the second language expressed in a script that is native to the second language.

(A15) According to some implementations of any of the methods of A1-A14, the method is performed by a user computing device.

(B1) According to another illustrative aspect, another method (e.g., the process 802) is described for recognizing speech of a user. The method includes: obtaining (e.g., 804) an instance of acoustic information (e.g., 206) for a current instance of time; and obtaining (e.g., 806) a prior instance of label information (e.g., 216) that has been previously predicted by the method. In a language-agnostic operation, the method includes encoding (e.g., 808) the instance of acoustic information to produce encoded acoustic information (e.g., 210), and producing (e.g., 810) prediction information (e.g., 224) based on the prior instance of label information. In a language-specific joint analysis operation (e.g., 812), the method includes producing first-language probabilities (e.g., 236) for symbols of a first language (e.g., L1) based on the encoded acoustic information and the prediction information, and producing second-language probabilities (e.g., 240) for symbols of a second language (e.g., L2) based on the encoded acoustic information and the prediction information.

In a weight modification operation (e.g., 906), the method includes modifying the first-language probabilities by a first weight (e.g., 258), to produce modified first-language probabilities (e.g., 264), and modifying the second-language probabilities by a second weight (e.g., 260), to produce modified second-language probabilities (e.g., 268), the first weight indicating a likelihood that the instance of acoustic information is expressed in the first language, and the second weight indicating a likelihood that the instance of acoustic information is expressed in the second language. In a label search operation (e.g., 908) performed over symbols of the first language and the second language, the method includes predicting an updated instance of label information (e.g., 212) based on the modified first-language probabilities and the modified second-language probabilities.

Among other technical merits, the method of B1 is capable of handling code-mixed utterances. Further, the method of B1 has a small memory footprint and exhibits good latency-related performance In yet another aspect, some implementations of the technology described herein include a computing system (e.g., computing system 102, 1202). The computing system includes hardware logic circuitry (e.g., 1214) that is configured to perform any of the methods described herein (e.g., any of the methods of A1-A14 and B1).

In yet another aspect, some implementations of the technology described herein include a computer-readable storage medium (e.g., the computer-readable storage media 1206) for storing computer-readable instructions (e.g., 1208). The computer-readable instructions, when executed by one or more hardware processors (e.g., 1204), perform any of the methods described herein (e.g., any of the methods of A1-A14 and B1).

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms can be configured to perform an operation using the hardware logic circuitry 1214 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for recognizing speech, comprising:
    obtaining an instance of acoustic information for a current instance of time;
    obtaining a prior instance of label information that has been previously predicted by the method;
    encoding the instance of acoustic information to produce encoded acoustic information;
    producing prediction information based on the prior instance of label information;
    in a language-specific joint analysis operation, producing first-language probabilities for symbols of a first language based on the encoded acoustic information and the prediction information, and producing second-language probabilities for symbols of a second language based on the encoded acoustic information and the prediction information;
    in a weight-generating operation, producing weighting information for the first language and the second language based on the encoded acoustic information, the weighting information including a first weight that indicates a likelihood that the instance of acoustic information is expressed in the first language, and a second weight that indicates a likelihood that the instance of acoustic information is expressed in the second language;

in a weight modification operation, modifying the first-language probabilities by the first weight, to produce modified first-language probabilities, and modifying the second-language probabilities by the second weight, to produce modified second-language probabilities; and predicting an updated instance of label information based on the modified first-language probabilities and the modified second-language probabilities, the method being performed by one or more neural networks, wherein the method is performed based on a machine-trained model, and wherein the machine-trained model is trained based on a collection of utterances that include words in the first language expressed in a script that is native to the first language, and words in the second language expressed in a script that is native to the second language.

2. The computer-implemented method of claim 1, wherein the speech that is recognized includes an utterance that mixes words in the first language and words in the second language.

3. The computer-implemented method of claim 1, wherein the speech that is recognized includes an utterance that is expressed in either the first language or the second language.

4. The computer-implemented method of claim 1, wherein the method is performed for three or more languages.

5. The computer-implemented method of claim 1, wherein the machine-trained model includes an encoder machine-trained model, and wherein said encoding the instance of acoustic information uses the same encoder machine-trained model for both the first language and the second language.

6. The computer-implemented method of claim 1, wherein the machine-trained model includes a machine-trained prediction model, and wherein said producing prediction information uses the same machine-trained prediction model for both the first language and the second language.

7. The computer-implemented method of claim 1, wherein the weight-generating operation involves performing attention analysis based on the encoded acoustic information.

8. The computer-implemented method of claim 1, wherein the weight-generating operation includes:
performing self-attention on the encoded acoustic information to produce attention output information;
using a feed-forward neural network (FFN) to map the attention output information to FFN output information;
generating the weighting information based on the FFN output information.

9. The computer-implemented method of claim 1, further including smoothing the weighting information, prior to the weight modification operation, based on previously-generated weighting information.

10. The computer-implemented method of claim 1, wherein the language-specific joint analysis operation includes, for each particular language:
combining the encoded acoustic information with the prediction information, to produce combined information; and mapping the combined information into probabilities for symbols of the particular language.

11. The computer-implemented method of claim 1, wherein said predicting involves performing a single symbol search operation over symbols of the first language and the second language, based on the modified first-language probabilities and the modified second-language probabilities.

12. The computer-implemented method of claim 1, wherein the speech of the user mixes words in the first language and words in the second language, and wherein the method further includes generating output information that includes the words in the first language expressed in a script that is native to the first language, and the words in the second language expressed in a script that is native to the second language.

13. The computer-implemented method of claim 1, wherein the machine-trained model is trained by:
training a version of the model that omits model functionality that performs the weight-generating operation;
separately training the model functionality that performs the weight-generating operation; and
training a version of the model that includes the model functionality that performs the weight-generating operation, as trained by said separately training.

14. A computing system for recognizing speech, comprising:
a neural network implemented by hardware logic circuitry, the neural network being configured to perform operations including:
obtaining an instance of acoustic information for a current instance of time;
obtaining a prior instance of label information that has been previously predicted by the operations;
encoding the instance of acoustic information to produce encoded acoustic information;
producing prediction information based on the prior instance of label information;
in a language-specific joint analysis operation, producing first-language probabilities for symbols of a first language based on the encoded acoustic information and the prediction information, and producing second-language probabilities for symbols of a second language based on the encoded acoustic information and the prediction information;
in a weight-generating operation, producing weighting information for the first language and the second language based on the encoded acoustic information, the weighting information including a first weight that indicates a likelihood that the instance of acoustic information is expressed in the first language, and a second weight that indicates a likelihood that the instance of acoustic information is expressed in the second language;
in a weight modification operation, modifying the first-language probabilities by the first weight, to produce modified first-language probabilities, and modifying the second-language probabilities by the second weight, to produce modified second-language probabilities; and
predicting an updated instance of label information based on the modified first-language probabilities and the modified second-language probabilities,
wherein said encoding the instance of acoustic information uses a same encoder machine-trained model for both the first language and the second language.

15. The computing system of claim 14, wherein the weight-generating operation involves performing attention analysis based on the encoded acoustic information.

16. The computing system of claim 14, wherein the operations further include smoothing the weighting information, prior to the weight modification operation, based on previously-generated weighting information.

17. The computing system of claim 14, wherein said predicting involves performing a single symbol search operation over symbols of the first language and the second language, based on the modified first-language probabilities and the modified second-language probabilities.

18. The computing system of claim 14, wherein the operations are performed by a user computing device.

19. A non-transitory computer-readable storage medium for storing computer-readable instructions, the computer-readable instructions, when executed by one or more hardware processors, performing operations that comprise:

obtaining an instance of acoustic information for a current instance of time;

obtaining a prior instance of label information that has been previously predicted by the operations;

in a language-agnostic operation, encoding the instance of acoustic information to produce encoded acoustic information, and producing prediction information based on the prior instance of label information;

in a language-specific joint analysis operation, producing first-language probabilities for symbols of a first language based on the encoded acoustic information and the prediction information, and producing second-language probabilities for symbols of a second language based on the encoded acoustic information and the prediction information;

in a weight modification operation, modifying the first-language probabilities by a first weight, to produce modified first-language probabilities, and modifying the second-language probabilities by a second weight, to produce modified second-language probabilities, the first weight indicating a likelihood that the instance of acoustic information is expressed in the first language, and the second weight indicating a likelihood that the instance of acoustic information is expressed in the second language;

in a label search operation performed over symbols of the first language and the second language, predicting an updated instance of label information based on the modified first-language probabilities and the modified second-language probabilities, wherein said producing prediction information uses a same machine-trained prediction model for both the first language and the second language.

* * * * *